US008626355B2

(12) United States Patent
Shah et al.

(10) Patent No.: US 8,626,355 B2
(45) Date of Patent: Jan. 7, 2014

(54) COOLING PROVISIONING MANAGEMENT IN A THREE DIMENSIONAL PACKAGE

(75) Inventors: Amip Shah, Santa Clara, CA (US); Chandrakant Patel, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 551 days.

(21) Appl. No.: 12/935,985

(22) PCT Filed: Apr. 1, 2008

(86) PCT No.: PCT/US2008/059008
§ 371 (c)(1),
(2), (4) Date: Oct. 1, 2010

(87) PCT Pub. No.: WO2009/123621
PCT Pub. Date: Oct. 8, 2009

(65) Prior Publication Data
US 2011/0029153 A1    Feb. 3, 2011

(51) Int. Cl.
*G05D 23/00* (2006.01)
(52) U.S. Cl.
USPC ........................................ 700/300
(58) Field of Classification Search
USPC ........................................ 700/300
See application file for complete search history.

(56) References Cited

U.S. PATENT DOCUMENTS

| | | | |
|---|---|---|---|
| 6,791,150 B2 | 9/2004 | Takagi | |
| 2003/0212474 A1* | 11/2003 | Pippin | 700/300 |
| 2004/0264124 A1* | 12/2004 | Patel et al. | 361/686 |
| 2006/0090161 A1* | 4/2006 | Bodas et al. | 718/100 |
| 2006/0161375 A1* | 7/2006 | Duberstein et al. | 702/132 |
| 2006/0259621 A1* | 11/2006 | Ranganathan et al. | 709/226 |
| 2008/0281476 A1* | 11/2008 | Bose et al. | 700/300 |
| 2011/0029154 A1* | 2/2011 | Shah et al. | 700/300 |

FOREIGN PATENT DOCUMENTS

| | | |
|---|---|---|
| CN | 1836197 A | 9/2006 |
| CN | 101283323 A | 8/2008 |

OTHER PUBLICATIONS

Schindler-Saefkow et al. 'Thermal Management in a 3D-PCB-Package with Water Cooler' in: 1st Electronics System integration Technology Conference, IEEE, 2006, vol. I, pp. 107-110.
Khan et al. Development of 3D Stack Package Using Silicon Interposer for High Power Application in:56th Electronic Components and Technology Conference, IEEE, 2006 pp. 756-760.
English translation of CN101283323A ~ Methods and Apparatus for Dynamic Thermal Control ~ Oct. 8, 2008 ~ 22 pages.
English translation of CN1836197A ~ Multi-Stage Low Noise Integrated Object and System Cooling Solution ~ Sep. 20, 2006 ~ 13 pages.
OA Aug. 1, 2012 from China ~ Application No. 20088019257.X filed Nov. 12, 2010 (in Chinese).

* cited by examiner

*Primary Examiner* — Mohammad Ali
*Assistant Examiner* — Sivalingam Sivanesan

(57) ABSTRACT

In a method for managing cooling provisioning in a three-dimensional package containing a plurality of stacked die with a cooling system having at least one active cooling mechanism, at least one of workload on and an environmental condition at or around one of the plurality of stacked die is identified. In addition, at least one of the active cooling mechanism and the one of the plurality of stacked die is controlled based upon at least one of the identified workload and environmental condition.

16 Claims, 8 Drawing Sheets

COOLING PROVISIONING MANAGEMENT IN A THREE DIMENSIONAL PACKAGE

CROSS-REFERENCE TO RELATED APPLICATION

The present application is related to U.S. patent application Ser. No. 12/936,000, entitled "Management of a 3D Package and Cooling System", filed on even date herewith, the disclosure of which is hereby incorporated by reference in its entirety.

BACKGROUND

Recent trends in semiconductor technology have been focused towards miniaturization of integrated circuit chip systems. This has resulted in the development of high density electronic package modules, such as, three-dimensional (3D) multi-die structures, which are composed of a plurality of die that are arranged in a stack to substantially reduce the amount of floorspace that the die occupy in a system. As with conventional die, part of the electrical energy for driving the stacked die is converted into thermal energy and dissipated as heat. The temperatures of the die greatly affect their performance. As such, effective heat removal is typically an important consideration in designing and operating the 3D multi-die electronic package modules.

Heat is typically removed from the die through use of passive cooling provisioning, such as, thermally conductive material positioned to convey heat from one die to another die or to a heat sink. Techniques for actively cooling the die have also been proposed through use of thermoelectric coolers having a P-type material plate and an N-type material plate mounted between various die. However, as the electronic package modules continue to become more dense with die having ever-increasing operational speeds, conventional techniques for dissipating the heat generated by the die in 3D multi-die electronic package modules may be unable to adequately cool the die, which may lead to reduced performance and early failure.

It should therefore be appreciated that improvements in removing the heat dissipated from the die in 3D multi-die electronic package modules would be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method for managing cooling provisioning in a three-dimensional package containing a plurality of die arranged in a stacked configuration with a cooling system having at least one active cooling mechanism. Also disclosed herein is a three-dimensional package having a cooling system that is controlled according to the disclosed method.

Through implementation of the method and three-dimensional package disclosed herein, one or both of the die and the cooling system may be controlled to substantially minimize energy consumption while providing adequate cooling to the die.

Figure 1A:
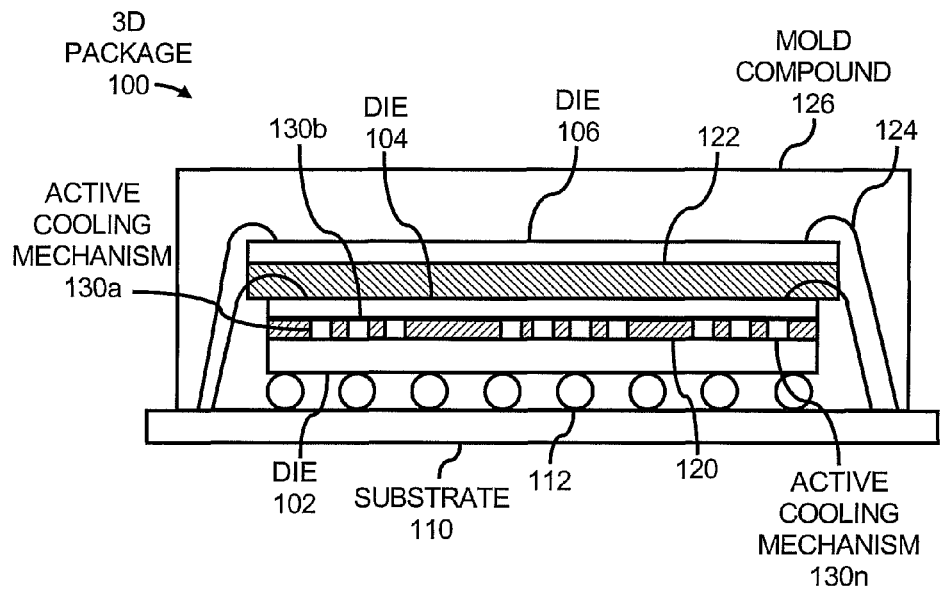
FIG. 1A depicts a simplified schematic diagram of a three-dimensional package containing a plurality of stacked die and a cooling system having a plurality of active cooling mechanisms, according to an embodiment of the invention.

With reference first to FIG. 1A, there is shown a simplified schematic diagram of a three-dimensional package 100 containing a plurality of stacked die 102-106 and a cooling system having a plurality of active cooling mechanisms 130a-130n, according to an example. In one regard, the various methods and systems disclosed herein may be implemented in the three-dimensional package 100 depicted in FIG. 1A as discussed in greater detail herein below. It should be understood that the three-dimensional package 100 may include additional components and that some of the components described herein may be removed and/or modified without departing from a scope of the three-dimensional package 100.

As shown in FIG. 1A, the three-dimensional package 100 includes a plurality of die 102-106. The die 102-106 may comprise integrated circuit chips configured to perform any reasonably suitable function. By way of example, a first die 102 may comprise a processor die and a second and third die 104 and 106 may comprise flash memory die. In another example, the three-dimensional package 100 may comprise a solid-state memory package, in which the die 102-106 may each comprise flash memories.

The first die 102 is depicted as being mounted on a substrate 110 through a plurality of solder joints 112. The second die 104 is depicted as being attached to the first die 102 through an adhesive material 120, which may comprise a thermally conductive material. In addition, the third die 106 is depicted as being attached to the second die 104 through another adhesive material 122, which may also comprise a thermally conductive material. The second die 104 and the third die 106 are also depicted as being connected to the substrate 110 through various interconnects 124, which may comprise wirebonds, flip-chip interconnects, photonic interconnects, etc. configured to enable at least one of power and electronic signals to be communicated between the die 104 and 106 and the substrate 110. In addition, or alternatively, the third die 106 may be connected to the second die 104, which is connected to the substrate 110. The die 102-106 are further depicted as being supported within a mold compound 126, which operates to protect the die 102-106 and through which some of the heat generated in the die 102-106 may be dissipated.

Also depicted in FIG. 1A are a plurality of active cooling mechanisms 130a-130n, where "n" is an integer equal to or greater than zero, positioned in the adhesive material 120. Although not shown in FIG. 1A, some or all of the active cooling mechanisms 130a-130n may be integrated into one or more of the die 102-106 without departing from a scope of the three-dimensional package 100.

Active cooling mechanisms 130a-130n may generally be defined as cooling mechanisms that consume electrical energy during their operation and are generally more effective at removing heat as compared with passive cooling mechanisms. Active cooling mechanisms 130a-130n may therefore be controlled by variations in the electrical energy supplied to the active cooling mechanisms 130a-130n. According to an example, the active cooling mechanisms 130a-130n comprise thermoelectric coolers, which include a P-type material plate and an N-type material plate. The P-type material plate and the N-type material plate may operate by the Peltier effect to draw heat from the first die 102 and deliver the heat to the second die 104, which may act to spread the heat. In this example, the active cooling mechanisms 130a-130n may be electrically connected to the substrate 110 to receive direct current (DC) power.

According to another example, the active cooling mechanisms 130a-130n comprise other types of mechanisms, such as, cold plates through which a cooling fluid flows is pumped. In this example, an electronically controllable pump (not shown) may be operated to vary the cooling fluid flow through the cold plates and thereby vary the amount of heat removed from the die 102-106. In addition, or alternatively, the cold plates may include insulating material that may be pumped therethrough to vary the amount of heat transferred between the die 102-106, for instance. The active cooling mechanisms 130a-130n may individually controllable, such that, active cooling mechanisms 130a-130n positioned between different sets of die 102-106 may be activated at different times, for instance. By way of particular example, the active cooling mechanisms 130a-130n may comprise liquid cooled loops with controllable valves that may be opened as desired.

In any regard, the active cooling mechanisms 130a-130n may strategically be placed at various locations with respect to the die 102-106. The various locations may include those locations known to dissipate the greatest amount of heat, such as, local hot spots on one or more of the die 102-106. In this regard, heat removal from the die 102-106 may be targeted, thereby substantially optimizing energy efficiency in operating the active cooling mechanisms 130a-130n.

Although the active cooling mechanisms 130a-130n have been depicted as being positioned between the first die 102 and the second die 104, active cooling mechanisms 130a-130n may also be positioned between the second die 104 and the third die 106, between the first die 102 and the third die 106, across multiple die 102-106, etc. In addition, the three-dimensional package 100 may include any reasonably suitable number of die and active cooling mechanisms without departing from a scope of the three-dimensional package 100.

Figure 1B:
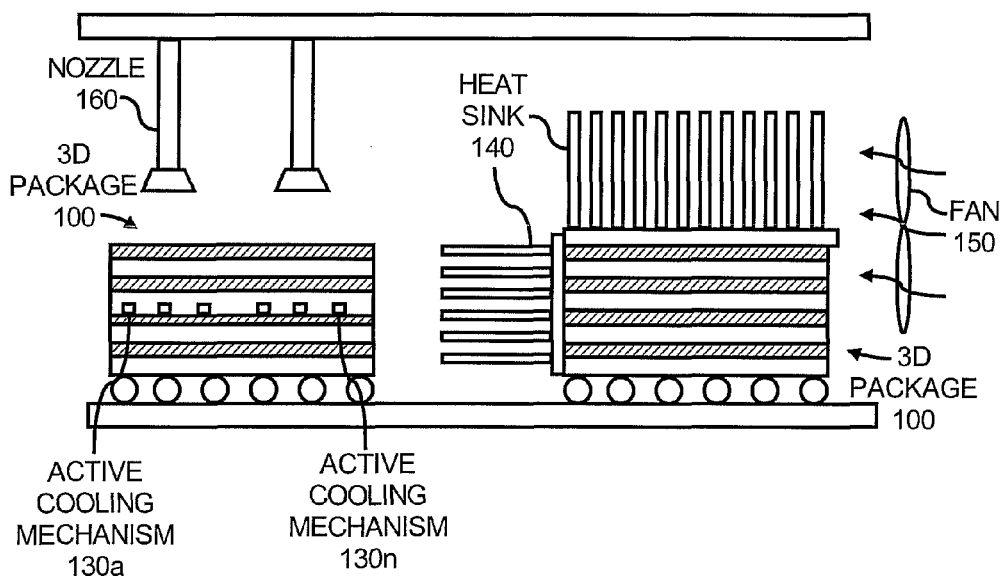
FIG. 1B depicts a simplified schematic diagram of a three-dimensional package containing a plurality of stacked die and a cooling system having a plurality of active cooling mechanisms, according to another embodiment of the invention.

The three-dimensional package 100 may also be equipped with other types of cooling mechanisms, both active and passive. Passive cooling mechanisms may generally be defined as mechanisms that are configured to dissipate heat generated by one or more of the die 102-106 or the package 100 itself, without requiring electrical energy. Some of these active and passive cooling mechanisms are depicted in FIG. 1B. As shown therein, passive cooling mechanisms, such as heat sinks 140, may be positioned along various axes of a three-dimensional package 100. Although not shown, other types of passive cooling mechanisms, such as, heat pipes, may also be positioned between two or more of the die 102-106 and may be thermally connected to one or more heat sinks 140 to convey heat from the die 102-106 to the one or more heat sinks 140.

As also shown in FIG. 1B, some or all of the active cooling mechanisms 130a-130n may be integrally formed with at least one of the die 102-106. The active cooling mechanisms 130a-130n are further depicted as including an electronically controllable fan 150 configured to provide airflow to one or more packages 100. The active cooling mechanisms 130a-130n may also include one or more nozzles 160 for supplying either cooling fluid, either liquid or air, to the packages 100. In one example, the nozzles 160 may be configured and operated to provide substantially precise delivery of the cooling fluid to desired locations on the packages 100. In another example, the nozzles 160 may be controlled to deliver the cooling fluid according to the amount of heat generated in the packages 100.

It should be understood that the various package 100 and cooling provisioning configurations shown in FIG. 1B may be modified without departing from a scope of the three-dimensional package 100 and cooling system discussed herein. For instance, one or more packages 100 may be stacked on top of each other, packages 100 may be arranged to lie on their sides, heat sinks 140 may be attached to multiple packages 100, etc.

Figure 2:
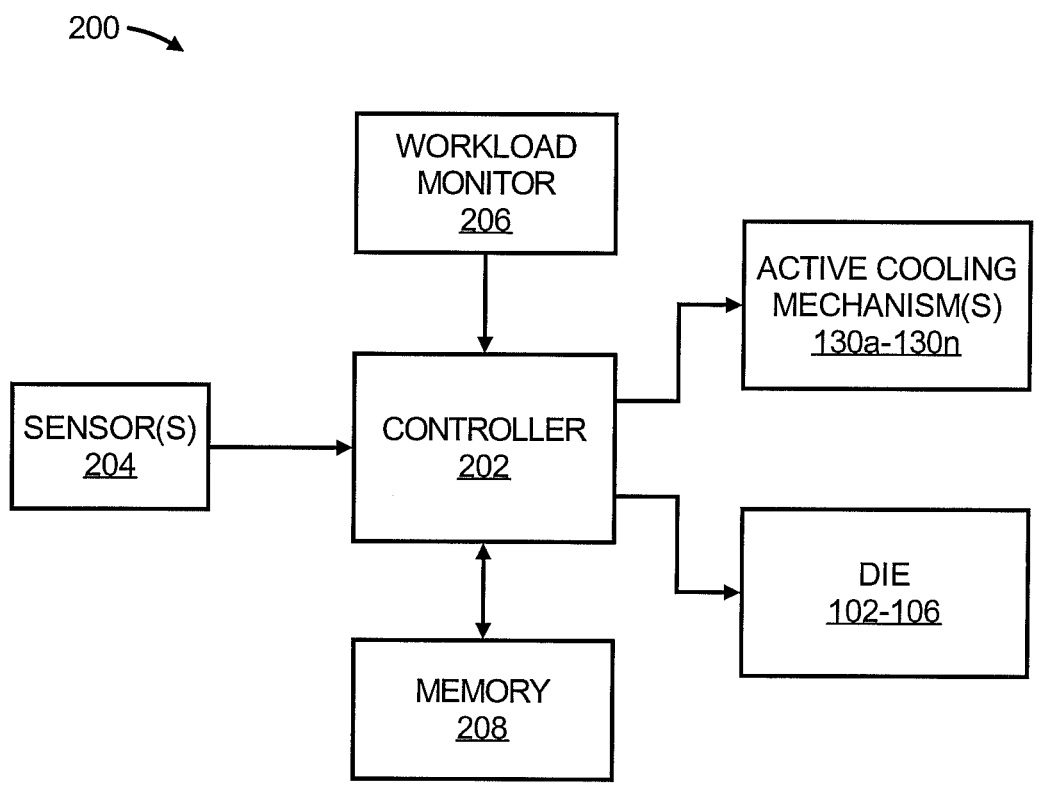
FIG. 2 shows a simplified block diagram of a system for managing cooling provisioning in a three-dimensional package with a cooling system having at least one active cooling mechanism, according to an embodiment of the invention.

Turning now to FIG. 2, there is shown a simplified block diagram of a system 200 for managing cooling provisioning in a three-dimensional package 100 with a cooling system having at least one active cooling mechanism 130a-130n. It should be understood that the system 200 may include additional components and that one or more of the components described herein may be removed and/or modified without departing from a scope of the system 200.

As shown therein, the system 200 includes a controller 202 configured to perform various computing operations in the system 200. The controller 202 may comprise, for instance, one of the die 102-106 in a package, a processor remotely located from the package 100, a computing device, etc. Alternatively, however, the controller 202 may comprise software stored on a computer readable storage medium, that when implemented, is configured to perform various operations in the system 200.

As also shown in FIG. 2, the controller 202 is configured to receive input from one or more sensors 204 and/or a workload monitor 206. The controller 202 is configured to control either or both of the one or more active cooling mechanisms 130*a*-130*n* and the one or more die 102-106 based upon the input received from either or both of the sensor(s) 204 and the workload monitor 206. In performing these operations, the controller 202 may store the received input in a memory 208, which may comprise one of the die 102-106. In one example, the controller 202 may access programs or algorithms stored in the memory 208 in determining how the active cooling mechanism(s) 130*a*-130*n* are to be manipulated based upon the data contained in the input. In another example, the controller 202 may access programs or algorithms stored in the memory 208 in determining how workloads should be placed on the respective die 102-106 based upon the data contained in the input. Various programs or algorithms stored in the memory 208 are described below with respect to the flow diagrams.

The sensor(s) 204 may be configured and positioned to detect one or more environmental conditions, such as, temperature, vibration, airflow, optical conditions, etc. By way of example, the sensors 204 may comprise temperature sensors configured and positioned to detect the temperatures of one or more of the die 102-106. According to this example, the sensor(s) 204 may be positioned to detect temperatures at particular locations on the die 102-106, such as, known hot spots of the die 102-106. In addition, or alternatively, the sensor(s) 204 may monitor a condition that may be calculated to determine a correlated condition. For instance, the sensor(s) 204 may monitor electrical resistance and may calculate temperature from the monitored electrical resistance. In any regard, the controller 202 may process the temperature information received from the sensor(s) 204 to determine the workload on each of the die 102-106. More particularly, for instance, the controller 202 may correlate a particular workload level from the detected environmental condition at or around the die 102-106.

In addition, or alternatively, the controller 202 may determine the workload in each of the die 102-106 based upon information received from the workload monitor 206. The workload monitor 206 may comprise, for instance, hardware and/or software configured to at least one of predict and track workloads and to determine which of the packages 100 is capable of performing the requested workloads. The workload monitor 206 may therefore communicate the workload requests to the controller 202 and the controller 202 may determine on which of the die 102-106 in one or more packages 100 the workload is to be placed based upon various considerations as discussed below.

Figure 3:
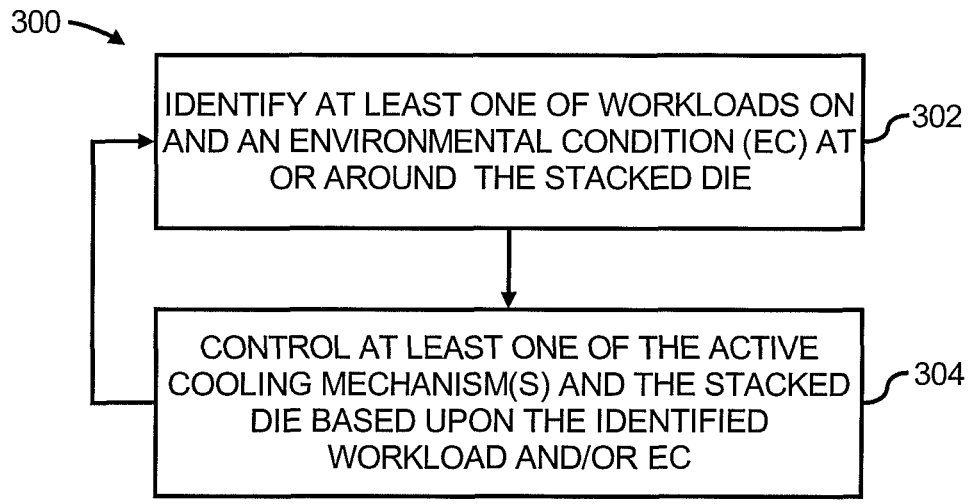
FIG. 3 shows a flow diagram of a method for managing cooling provisioning in a three-dimensional package containing a plurality of stacked die with a cooling system having at least one active cooling mechanism, according to an embodiment of the invention.

With reference first to FIG. 3, there is shown a flow diagram of a method 300 for managing cooling provisioning in a three-dimensional package 100 containing a plurality of stacked die 102-106 with a cooling system having at least one active cooling mechanism 130*a*-130*n*, according to an example. It should be understood that the method 300 may include additional steps and that one or more of the steps described herein may be removed and/or modified without departing from a scope of the method 300.

The description of the method 300 is made with reference to the system 200 depicted in FIG. 2 and thus makes particular reference to the elements contained in the system 200. It should, however, be understood that the method 300 may be implemented in a system that differs from the system 200 without departing from a scope of the method 300.

Generally speaking, the controller 202 may implement the method 300 to efficiently manage cooling provisioning in a three-dimensional package 100 containing a plurality of stacked die. In one example, cooling provisioning may be efficiently managed by selectively activating one or more active cooling mechanisms according to the workloads, and thus, the environmental conditions, of the plurality of stacked die. In another example, the cooling provisioning may be efficiently managed by selectively placing workloads, such as, storage of data, onto those stacked die that are operable to be cooled with minimal energy consumption by the at least one active cooling mechanism.

With particular reference again to FIG. 3, at step 302, the controller 202 identifies at least one of workloads on and an environmental condition at or around one or more of the stacked die 102-106. According to an example, the controller 202 may identify the workloads from environmental condition data received from the one or more sensors 204. In this example, the controller 202 may correlate, for instance, the temperature data with particular workload levels. For instance, the correlation between temperature levels and workload levels may be stored as a lookup table in the memory 208, which the controller 202 may access in identifying the workloads. According to another example, the controller 202 may simply store the environmental condition data received from the one or more sensors 204.

According to a further example, the controller 202 may identify the workloads from data received from the workload monitor 206. In this example, the workload monitor 206 may track or predict the workloads that have been or are scheduled to be assigned to the die 102-106 and may communicate this information to the controller 202.

At step 304, the controller 202 controls one or both of the at least one active cooling mechanism and at least one of the plurality of stacked die 102-106 based upon one or both of the identified workload and environmental condition.

Steps 302 and 304 may be repeated to continuously identify the workloads and/or environmental conditions on the stacked die and to continuously update control of the at least one active cooling mechanism 130*a*-130*n* and the stacked die 102-106 based upon the identified workloads and/or environmental conditions.

According to an example, at step 304, a plurality of the stacked die 102-106 may be controlled to perform the same workload through allocation of the same workload to the plurality of stacked die 102-106 to, for instance, provide redundancy in the performance of the workload. For instance, where the workload comprises storage of data, the data may be stored on multiple die 102-106 to provide redundant storage of the data.

Figure 4:
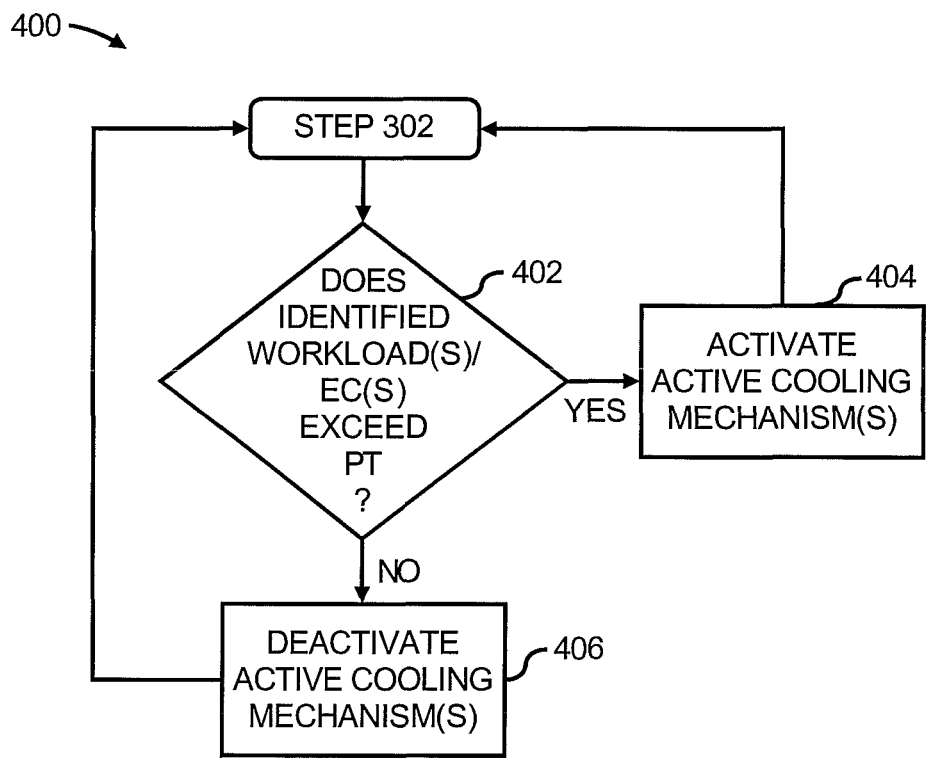
FIG. 4 shows a flow diagram of a method for managing cooling provisioning in a three-dimensional package containing a plurality of stacked die with a cooling system having at least one active cooling mechanism in furtherance to the flow diagram depicted in FIG. 3, according to an embodiment of the invention.

With reference now to FIG. 4, there is shown a flow diagram of a method 400 for managing cooling provisioning in a three-dimensional package 100 containing a plurality of stacked die 102-106 with a cooling system having at least one active cooling mechanism 130*a*-130*n*, according to an example. In the method 400, steps 404 and 406 are more detailed illustrations of an example of step 304 in FIG. 3.

As shown, at step 402, the controller compares the workloads on and/or environmental conditions at or around the die 102-106 identified at step 302 with a predetermined threshold (PT) range for each of the die 102-106. The PT range may be the same for each of the die 102-106, for instance, when the die 102-106 are configured to operate at around the same environmental conditions. Alternatively, the PT range may differ for one or more of the die 102-106, for instance, when one or more of the die 102-106 are configured to perform different types of workloads.

At step 402, if the identified workload for a die 102 exceeds the PT range, the controller 202 activates one or more active cooling mechanisms 130a-130n to increase cooling provisioning supplied to the die 102, as indicated at step 404. If, however, the identified workload falls below the PT range, and if at least one of the active cooling mechanisms 130a-130n is currently active, at step 406, the controller 202 deactivates one or more of the active cooling mechanisms 130a-130n to decrease cooling provisioning supplied to the die 102 and therefore conserves energy.

In the example depicted in FIG. 4, the controller 202 controls the at least one active cooling mechanism 130a-130n based upon an "as needed" basis, thereby substantially minimizing the amount of energy associated with operating the at least one active cooling mechanism 130a-130n. In addition, the controller 202 may separately control a plurality of active cooling mechanisms 130a-130n to provide substantially focalized cooing provisioning, which may also substantially minimize energy consumption. In other words, the controller 202 may activate one or more of the active cooling mechanisms 130a-130n while simultaneously deactivating other ones of active cooling mechanisms 130a-130n, depending upon, for instance, the locations of the die 102-106 and whether not the die 102-106 require additional cooling or may operate with lesser amounts of cooling.

In any regard, following either or both of steps 404 and 406, step 302 may be repeated to again identify workloads on and/or environmental conditions at or around the die 102-106, and may repeat steps 402-406 to substantially continuously monitor the workloads and/or environmental conditions and to substantially continuously control the active cooling mechanisms 130a-130n based upon changing conditions in the stacked die 102-106.

According to an example, the cooling system includes a plurality of active cooling mechanisms 130a-130n and the controller is configured to compare the workloads and/or environmental conditions with a plurality of PT ranges. In this example, during a first iteration of the method 400, the workload and/or environmental condition identified at step 302 is compared with a first PT range at step 402 and at least one of the active cooling mechanisms 130a-130n is controlled in response to the identified workload and/or environmental condition exceeding the first PT range at steps 404 and 406. In addition, for instance, when the identified workload and/or environmental condition exceeds the first PT range, during a second iteration of the method 400, the identified workload and/or environmental condition is compared with a second PT range, which comprises a higher threshold as compared with the first PT range. Based on the comparison, one or more second active cooling mechanisms 130a-130n are controlled at steps 404 and 406. By way of example, at step 404, a second active cooling mechanism 130b may be activated in response to the identified workload exceeding the second PT range to supplying greater cooling provisioning to one or more of the die 102-106.

Figure 5:
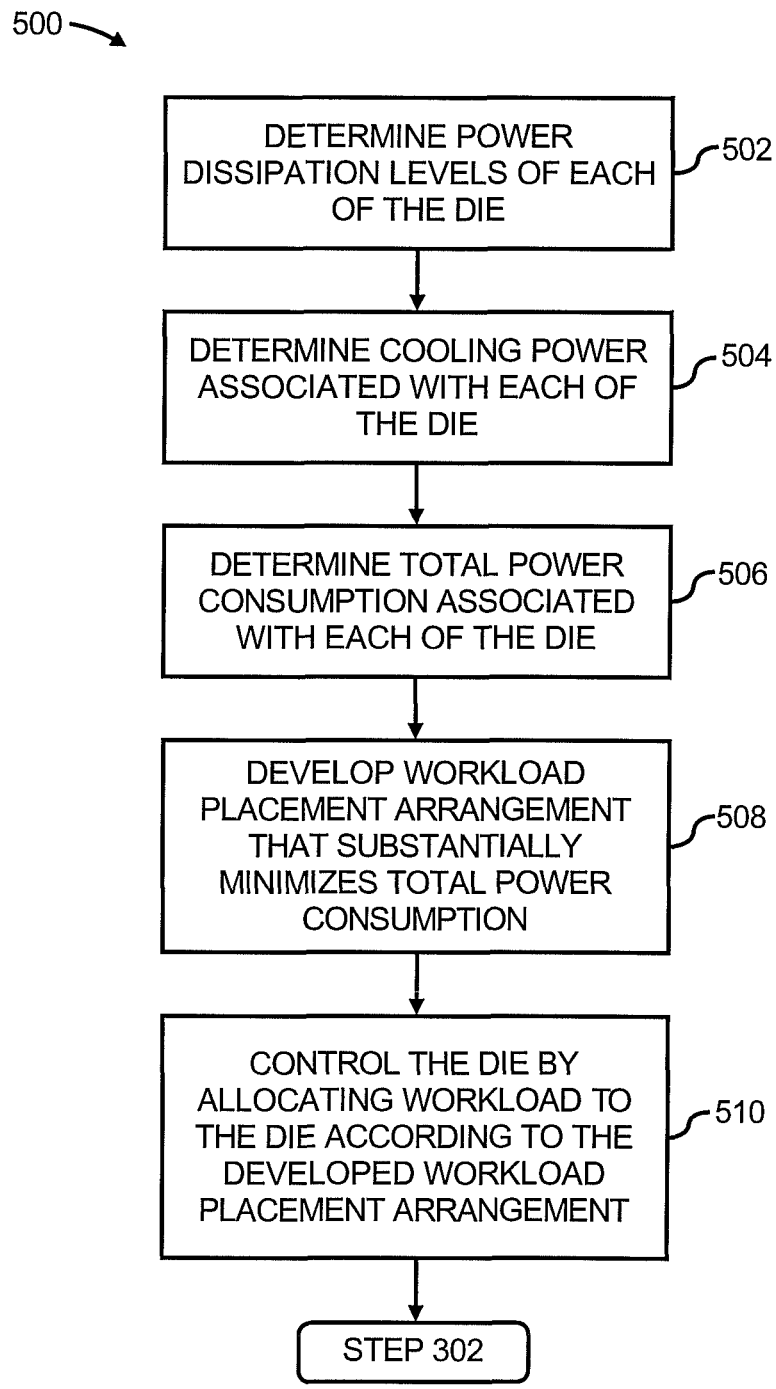
FIG. 5 shows a flow diagram of a method for managing cooling provisioning in furtherance of the flow diagram depicted in FIG. 3, according to another embodiment of the invention.

Turning now to FIG. 5, there is shown a flow diagram of a method 500 for managing cooling provisioning in furtherance of the method 300 depicted in FIG. 3, according to an example. It should be understood that the method 500 may include additional steps and that one or more of the steps described herein may be removed and/or modified without departing from a scope of the method 500.

As shown, the power dissipation levels of each of the die 102-106 in the three-dimensional package 100 are determined at step 502. The power dissipation levels may be determined or identified from the rated power dissipation levels of each of the die 102-106 as provided by the die 102-106 manufacturers. In addition, or alternatively, the power dissipation levels may be determined through testing of the die 102-106.

At step 504, the cooling power associated with each of the die 102-106 is determined. The cooling power of each of the die 102-106 may be defined as the amount of power the active cooling mechanisms 130a-130n consume in respectively cooling the die 102-106. Thus, for instance, the cooling power may be a function of the amount of heat generated by the die 102-106, the effectiveness of passive cooling mechanisms on the die 102-106, the efficiency and effectiveness of each of the active cooling mechanisms 130a-130n on the die 102-106, etc.

In addition, at step 506, the total power consumption levels of the die 102-106, which is a combination of the power dissipation levels and the cooling power levels of the die 102-106, may be determined from the power dissipation levels and the cooling power levels of each of the die 102-106.

At step 508, the controller 202 develops a workload placement arrangement that substantially minimizes the total power consumption levels of the die 102-106. More particularly, for instance, the controller 202 may arrange the total power consumption levels the die 102-106 in a hierarchical manner to determine which of the die 102-106 are able to perform the workloads while consuming the least amount of total power, both in terms of power dissipation levels and the cooling power. In addition, at step 510, the controller 202 further controls the die 102-106 (step 304 in FIG. 3) by allocating workload to the die 102-106 according to the workload placement arrangement developed at step 508.

Steps 502-508 may be performed prior to step 302 in FIG. 3 and step 510 may be performed in place of step 304 in FIG. 3.

Following step 510, steps 302 and 304 may be performed to update the control of the at least one active cooling mechanism and the stacked die based upon the workloads allocated at step 510.

Figure 6:
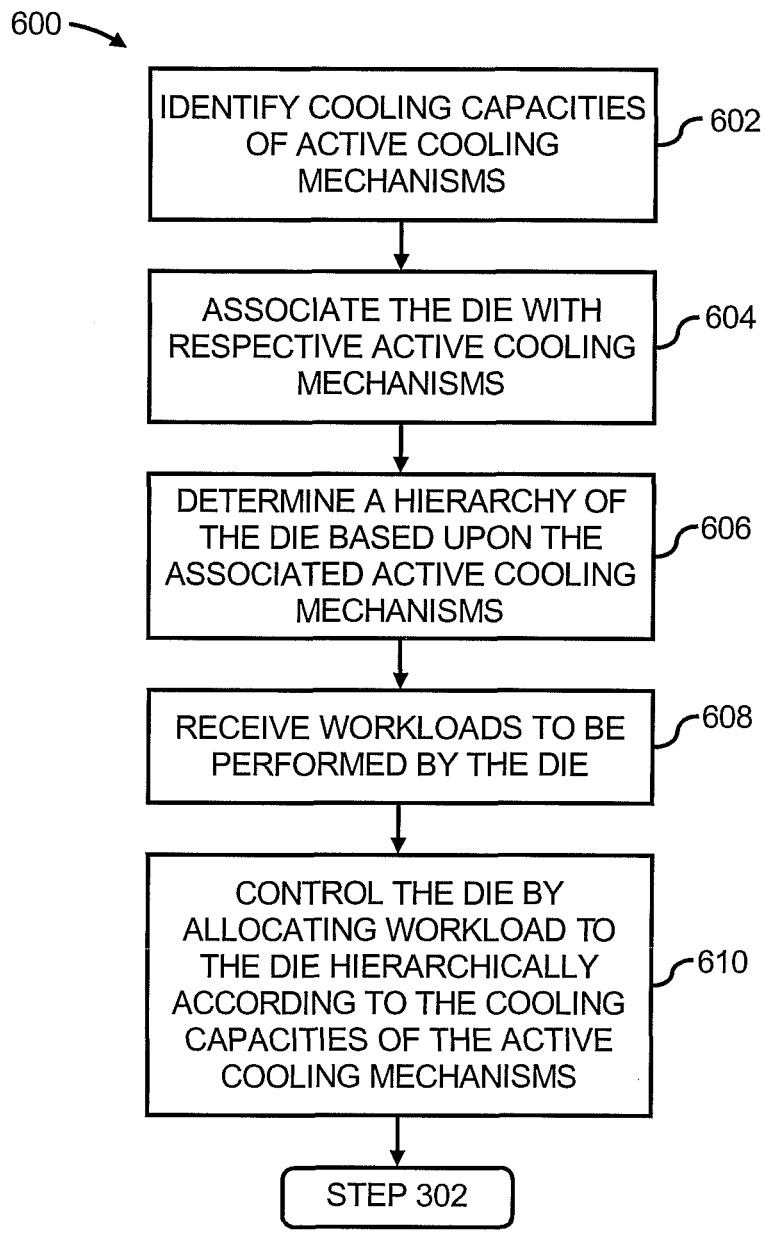
FIG. 6 shows a flow diagram of a method for managing cooling provisioning in furtherance of the flow diagram depicted in FIG. 3, according to another embodiment of the invention.

Turning now to FIG. 6, there is shown a flow diagram of a method 600 for managing cooling provisioning in furtherance of the method 300 depicted in FIG. 3, according to an example. It should be understood that the method 600 may include additional steps and that one or more of the steps described herein may be removed and/or modified without departing from a scope of the method 600.

At step 602, the cooling capacities of the active cooling mechanisms 130a-130n are identified. The cooling capacities may be defined as the operational and/or maximum levels of cooling the active cooling mechanisms 130a-130n are able to provide to the die 102-106. Thus, for instance, one or more of the active cooling mechanisms 130a-130n may be configured to provide greater levels of cooling provisioning as compared with other ones of the active cooling mechanisms 130a-130n.

At step 604, each of the die 102-106 is associated with one or more of the active cooling mechanisms 130a-130n. The "associations" between the die 102-106 and the active cooling mechanisms 130a-130n may be defined by the level of influence the active cooling mechanisms 130a-130n have over each of the die 102-106. By way of example, a die 102 may be associated with one or more active cooling mechanisms 130a-130n that have at least a predetermined minimum level of influence in the cooling provisioning provided to the die 102. According to an example, the associations may be determined by varying operations of the active cooling mechanisms 130a-130n and monitoring whether those variations have at least a predetermined level of influence on the die 102-106.

At step 606, the controller 202 determines a hierarchical relationship among the die 102-106 based upon which of the active cooling mechanisms 130a-130n are associated with which of the die 102-106. By way of example, the controller 202 may place those die 102-106 that are associated with the active cooling mechanisms 130a-130n having the highest cooling capacities at the highest level and those die 102-106 that are associated with the active cooling mechanisms 130a-130n having the lowest cooling capacities at the lowest level of the hierarchy.

At step 608, the controller 202 receives workloads that are to be performed by the die 102-106. In addition, at step 610, the controller 202 controls the die 102-106 (step 304 in FIG. 3) by allocating workload to the die 102-106 hierarchically according to the cooling capacities of the active cooling mechanisms 130a-130n. By way of example, at step 610, the controller 202 allocates workloads to the die 102-106 at the highest level of the hierarchy and then allocates the remaining workloads to the remaining die 102-106 according to their levels in the hierarchy.

Steps 602-608 may be performed prior to step 302 in FIG. 3 and step 610 may be performed in place of step 304 in FIG. 3. In addition, following step 610, steps 302 and 304 (step 610) may be performed to update the control of the at least one active cooling mechanism 130a-130n and the die 102-104 based upon the hierarchy of die 102-106 determined at step 606.

Figure 7:
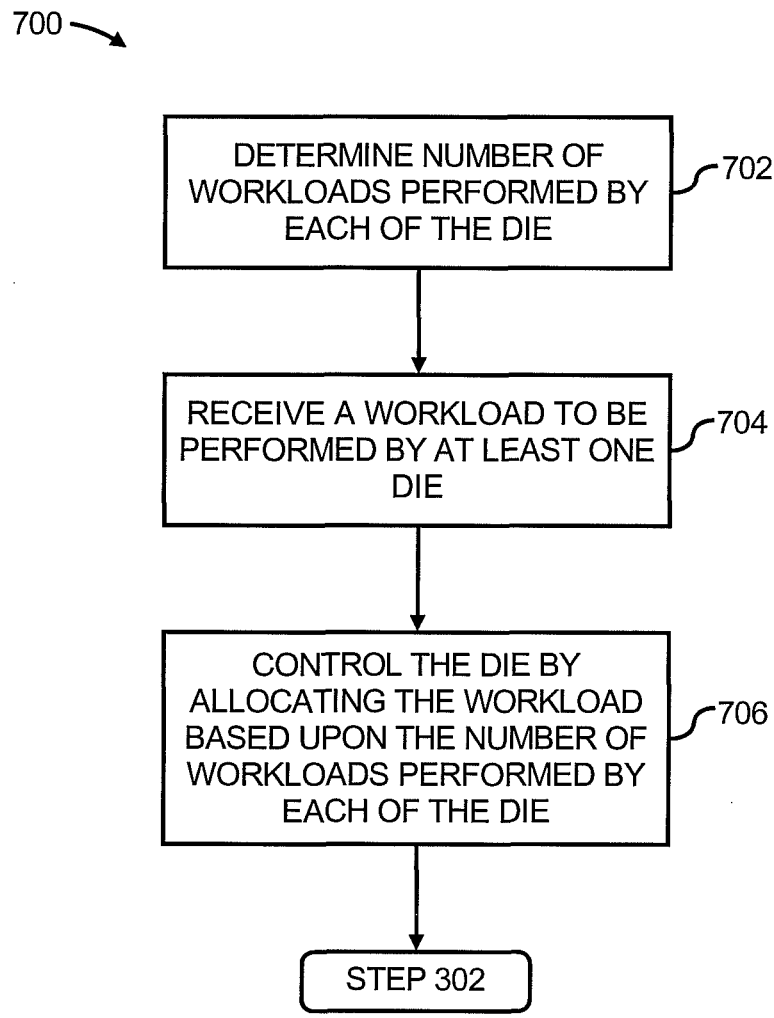
FIG. 7 shows a flow diagram of a method for managing cooling provisioning in furtherance of the flow diagram depicted in FIG. 3, according to a further embodiment of the invention.

Turning now to FIG. 7, there is shown a flow diagram of a method 700 for managing cooling provisioning in furtherance of the method 300 depicted in FIG. 3, according to an example. It should be understood that the method 700 may include additional steps and that one or more of the steps described herein may be removed and/or modified without departing from a scope of the method 700.

At step 702, the controller 202 determines the number of workloads that each of the die 102-106 has historically performed. Thus, for instance, the controller 202 may track how many operations each of the die 102-106 have performed throughout their lifetimes.

At step 704, the controller 202 receives a workload to be performed by at least one of the die 102-106. In addition, at step 706, the controller 202 controls the die 102-106 (step 304 in FIG. 3) by allocating workload to the die 102-106 based upon the number of workloads determined to have been performed by each of the die 102-106. By way of example, at step 706, the controller 202 first allocates workloads to the die 102-106 that have performed the least number of workloads, for instance, to prolong the useful lives of each of the die 102-106.

Steps 702 and 704 may be performed prior to step 302 in FIG. 3 and step 706 may be performed in place of step 304 in FIG. 3. In addition, following step 706, steps 302 and 304 (step 706) may be performed to update the control of the at least one active cooling mechanism 130a-130n and the die 102-104 based upon the hierarchy of die 102-106 determined at step 606.

Figure 8:
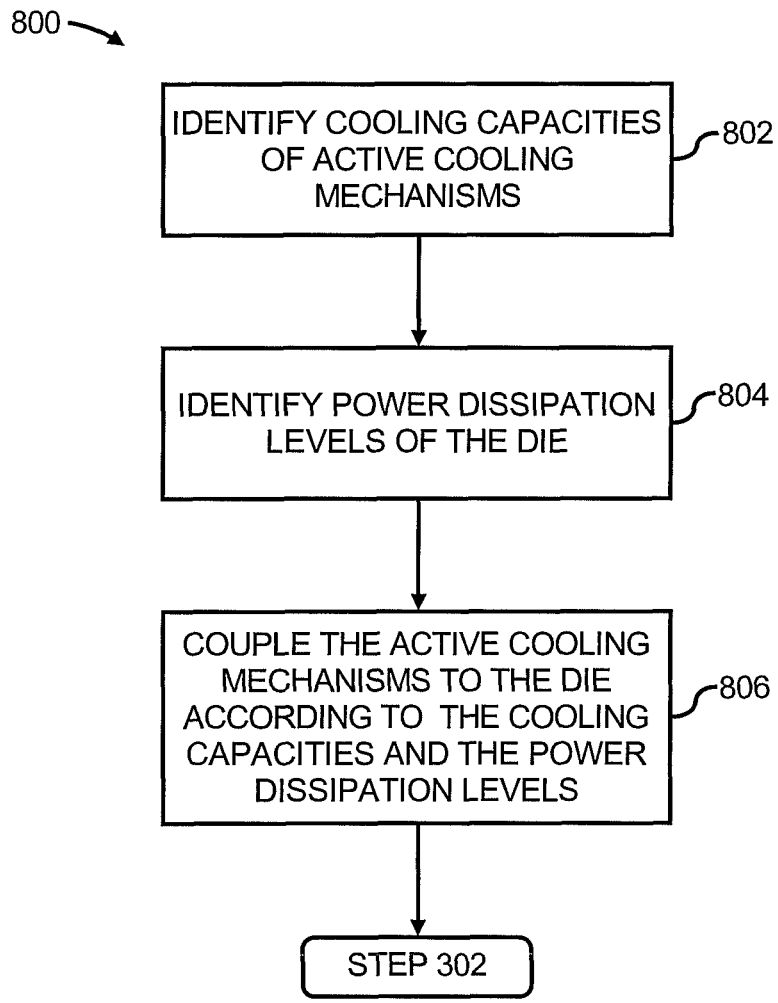
FIG. 8 shows a flow diagram of a method for managing cooling provisioning in furtherance of the flow diagram depicted in FIG. 3, according to a yet further embodiment of the invention.

With reference now to FIG. 8, there is shown a flow diagram of a method 800 for managing cooling provisioning in furtherance of the method 300 depicted in FIG. 3, according to an example. It should be understood that the method 800 may include additional steps and that one or more of the steps described herein may be removed and/or modified without departing from a scope of the method 800.

At step 802, the cooling capacities of a plurality of active cooling mechanisms 130-130n are identified. The cooling capacities may be identified in any reasonably suitable manner, such as, the manners discussed above with respect to step 602 (FIG. 6). At step 804, the power dissipation levels of the die 102-106 are identified. Again, the power dissipation levels may be identified in any reasonably suitable manner, such as, the manners discussed above with respect to step 502 (FIG. 5).

At step 806, the active cooling mechanisms 130a-130n are coupled to the die 102-106 according to the cooling capacities of the active cooling mechanisms 130a-130n identified at step 802 and the power dissipation levels of the die 102-106 identified at step 804. By way of example, the active cooling mechanisms 130a-130n having the highest cooling capacities may be physically coupled to the die 102-106 having the highest power dissipation levels.

Steps 802-806 may be performed prior to step 302 in FIG. 3 during, for instance, an initial construction stage or during a reconstruction operation of the three-dimensional package 100. In addition, following step 806, steps 302 and 304 may be performed as discussed above with respect to FIG. 3.

Some of the operations set forth in the methods 300-800 may be contained as one or more utilities, programs, or sub-programs, in any desired computer accessible or readable medium. In addition, the methods 300-800 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 9:
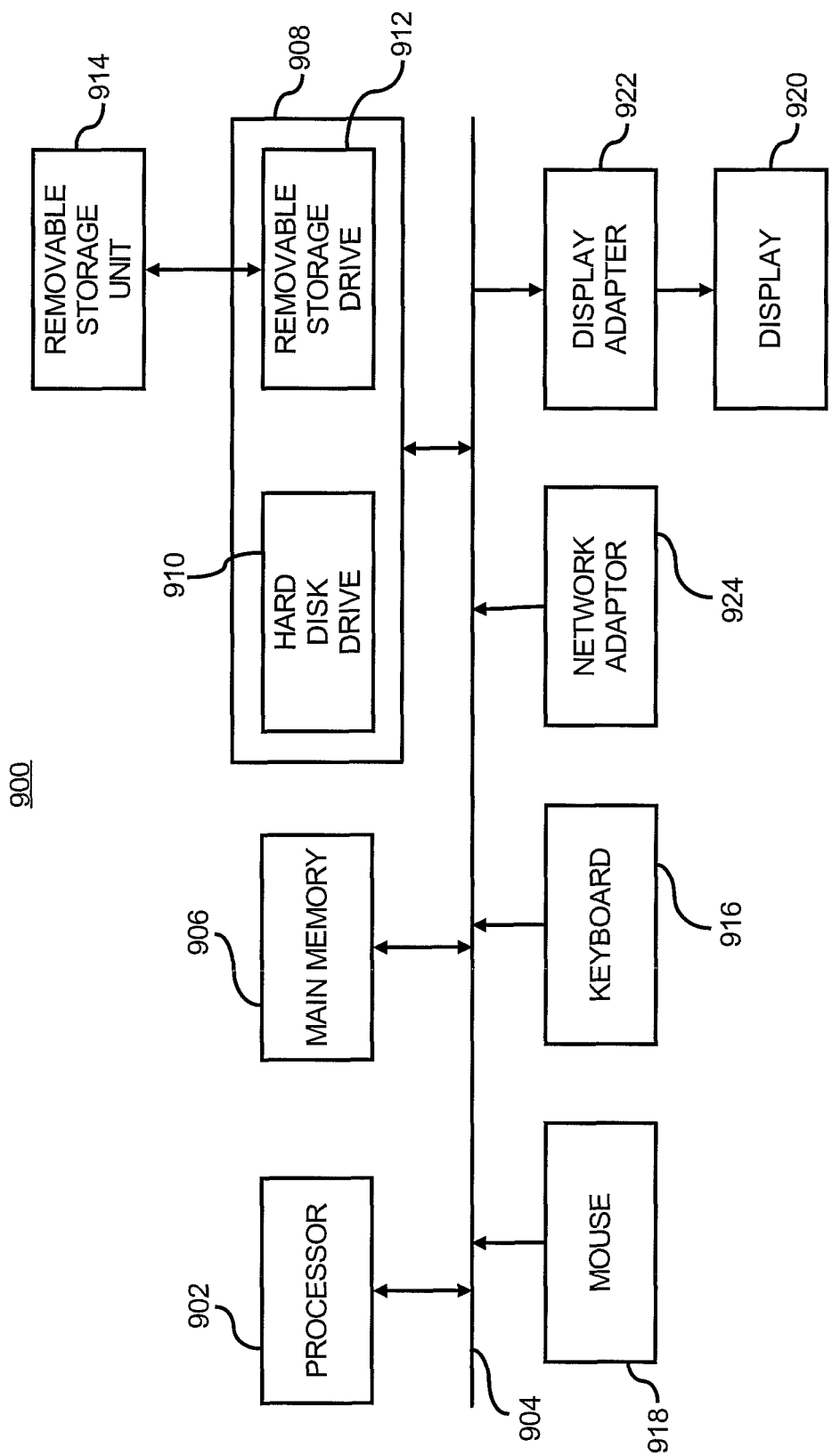
FIG. 9 illustrates a computer system, which may be employed to perform various functions of the controller depicted in FIG. 2 in performing some or all of the steps contained in the diagrams depicted in FIGS. 3-8, according to an embodiment of the invention.

FIG. 9 illustrates a computer system 900, which may be employed to perform the various functions of the controller 202 described herein above with, according to an example. In this respect, the computer system 900 may be used as a platform for executing one or more of the functions described hereinabove with respect to the controller 202.

The computer system 900 includes a processor 902, which may be used to execute some or all of the steps described in the methods 300-800. Commands and data from the processor 902 are communicated over a communication bus 904. The computer system 900 also includes a main memory 906, such as a random access memory (RAM), where the program code may be executed during runtime, and a secondary memory 908. The secondary memory 908 includes, for example, one or more hard disk drives 910 and/or a removable storage drive 912, representing a floppy diskette drive, a magnetic tape drive, a compact disk drive, etc., where a copy of the program code for managing cooling provisioning in a three-dimensional package may be stored.

The removable storage drive 910 reads from and/or writes to a removable storage unit 914 in a well-known manner. User input and output devices may include a keyboard 916, a mouse 918, and a display 920. A display adaptor 922 may interface with the communication bus 904 and the display 920 and may receive display data from the processor 902 and convert the display data into display commands for the display 920. In addition, the processor 902 may communicate over a network, for instance, the Internet, LAN, etc., through a network adaptor 924.

It will be apparent to one of ordinary skill in the art that other known electronic components may be added or substituted in the computer system 900. In addition, the computer system 900 may include a system board or blade used in a rack in a data center, a conventional "white box" server or computing device, etc. Also, one or more of the components in FIG. 9 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for managing cooling provisioning in a three-dimensional package containing a plurality of stacked die with a cooling system having a plurality of active cooling mechanisms, said method comprising:
   identifying cooling capacities of each of the plurality of active cooling mechanisms, wherein at least two of the plurality of active cooling mechanisms have different cooling capacities with respect to each other;
   associating each of the plurality of stacked die with a respective active cooling mechanism;
   receiving a plurality of workloads to be performed by the plurality of stacked die; and
   allocating the plurality of workloads on the plurality of stacked die hierarchically according to the cooling capacities of the active cooling mechanisms and the association of each of the plurality of stacked die with the respective active cooling mechanism.

2. The method according to claim 1, further comprising:
   identifying at least one of workload on and an environmental condition at or around one of the plurality of stacked die;
   comparing at least one of the identified workload and environmental condition with a predetermined threshold range, and
   wherein allocating the plurality of workloads further comprises allocating the plurality of workloads in response to at least one of the identified workload and environmental condition exceeding the predetermined threshold range and deactivating at least one of the plurality of active cooling mechanisms in response to at least one of the identified workload and environmental condition falling below the predetermined threshold range.

3. The method according to claim 2, wherein the plurality of active cooling mechanisms comprises a first active cooling mechanism and a second active cooling mechanism, wherein the predetermined threshold range comprises a first predetermined threshold range and comparing at least one of the identified workload and environmental condition further comprises comparing at least one of the identified workload and environmental condition with the first predetermined threshold range, and wherein controlling the active cooling mechanism further comprises activating the first active cooling mechanism in response to at least one of the identified workload and environmental condition exceeding the first predetermined threshold range.

4. The method according to claim 3, further comprising:
   comparing at least one of the identified workload and environmental condition with a second predetermined threshold range, wherein the second predetermined threshold range comprises a higher threshold range as compared with the first predetermined threshold range; and
   controlling the second active cooling mechanism based upon whether at least one of the identified workload and environmental condition falls within the second predetermined threshold range.

5. The method according to claim 4, wherein controlling the second active cooling mechanism further comprises activating the second active cooling mechanism in response to at least one of the identified workload and environmental condition exceeding the second predetermined threshold range.

6. The method according to claim 1,
   wherein allocating the plurality of workloads further comprises allocating at least one of the plurality of workloads to multiple ones of the plurality of stacked die to duplicate the at least one of the plurality of workloads across the multiple ones of the plurality of stacked die.

7. The method according to claim 1, further comprising:
   determining a number of workloads historically performed by each of the plurality of stacked die; and
   wherein allocating the plurality of workloads further comprises allocating the plurality of workloads to the plurality of stacked die based upon the number of workloads performed by each die of the plurality of stacked die.

8. The method according to claim 1, wherein at least two of the plurality of stacked die have different power dissipation levels with respect to each other,
   wherein associating the plurality of stacked die with a respective active cooling mechanism further comprises associating the active cooling mechanism having a highest cooling capacity to the die having a highest power dissipation level.

9. A three-dimensional package comprising:
   a plurality of die positioned in a stacked arrangement with respect to each other;
   a cooling system having,
      a plurality of active cooling mechanisms to actively dissipate heat generated by a die of the plurality of stacked die, wherein at least two of the plurality of active cooling mechanisms have different cooling capacities with respect to each other
      a processor; and
      a memory on which is stored machine readable instructions that cause the processor to:
         identify cooling capacities of each of the plurality of active cooling mechanisms, wherein at least two of the plurality of active cooling mechanisms have different cooling capacities with respect to each other;
         associate each of the plurality of stacked die with a respective active cooling mechanism;
         receive a plurality of workloads to be performed by the plurality of stacked die; and
         allocate the plurality of workloads on the plurality of stacked die hierarchically according to the cooling capacities of the active cooling mechanisms and the association of each of the plurality of stacked die with the respective active cooling mechanism.

10. The three-dimensional package according to claim 9, further comprising a temperature sensor to monitor temperature on at least one of the plurality of stacked die, wherein the machine readable instructions are further to cause the processor to correlate the monitored temperature to a particular workload.

11. The three-dimensional package according to claim 9, further comprising a workload monitor to at least one of predict and track workloads on the plurality of stacked die, and wherein the machine readable instructions are further to cause the processor to receive the at least one of the predicted and tracked workloads from the workload monitor.

12. The three-dimensional package according to claim 9, wherein at least one of the plurality of active cooling mechanisms is integrally formed with at least one die of the plurality of stacked die.

13. The three-dimensional package according to claim 9, wherein the processor is to separately control at least two of the plurality of active cooling mechanisms.

14. The three-dimensional package according to claim 9, wherein the machine readable instructions are further to cause the processor to:
   determine a number of workloads historically performed by each of the plurality of stacked die and allocate the plurality of workloads to the plurality of stacked die based upon the number of workloads performed by each die of the plurality of stacked die.

15. The three-dimensional package according to claim 9, wherein the controller machine readable instructions are further to cause the processor to identify at least one of workload on and an environmental condition at or around one of the plurality of stacked die, to compare at least one of the identified workload and environmental condition with a predetermined threshold range, and to allocate the plurality of workloads in response to at least one of the identified workload and environmental condition exceeding the predetermined threshold range and to deactivate at least one of the plurality of active cooling mechanisms in response to at least one of the identified workload and environmental condition falling below the predetermined threshold range.

16. A non-transitory computer readable storage medium on which is embedded one or more computer programs, said one or more computer programs, when executed by a processor cause the processor to implement a method for managing cooling provisioning in a three-dimensional package containing a plurality of stacked die with a cooling system having a plurality of active cooling mechanisms, said one or more computer programs comprising computer readable code to:
   identify cooling capacities of each of the plurality of active cooling mechanisms, wherein at least two of the plurality of active cooling mechanisms have different cooling capacities with respect to each other;
   associate each of the plurality of stacked die with a respective active cooling mechanism;
   receive a plurality of workloads to be performed by the plurality of stacked die; and
   allocate the plurality of workloads on the plurality of stacked die hierarchically according to the cooling capacities of the active cooling mechanisms and the association of each of the plurality of stacked die with the respective active cooling mechanism.

* * * * *

UNITED STATES PATENT AND TRADEMARK OFFICE
CERTIFICATE OF CORRECTION

| | |
|---|---|
| PATENT NO. | : 8,626,355 B2 |
| APPLICATION NO. | : 12/935985 |
| DATED | : January 7, 2014 |
| INVENTOR(S) | : Amip Shah et al. |

It is certified that error appears in the above-identified patent and that said Letters Patent is hereby corrected as shown below:

On the Title Page, item (54) and in the Specification, column 1, line 2, Title, delete "THREE DIMENSIONAL" and insert -- THREE-DIMENSIONAL --, therefor.

Signed and Sealed this
Third Day of June, 2014

Michelle K. Lee
*Deputy Director of the United States Patent and Trademark Office*